(12) United States Patent
Hilditch

(10) Patent No.: US 7,681,561 B2
(45) Date of Patent: Mar. 23, 2010

(54) FUEL DELIVERY SYSTEM FOR MULTI-FUEL ENGINE

(75) Inventor: James Hilditch, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/463,845

(22) Filed: May 11, 2009

(65) Prior Publication Data

US 2010/0024780 A1 Feb. 4, 2010

Related U.S. Application Data

(63) Continuation of application No. 12/184,072, filed on Jul. 31, 2008, now Pat. No. 7,546,835.

(51) Int. Cl.
*F02B 13/00* (2006.01)

(52) U.S. Cl. .................. 123/575; 123/577; 123/1 A; 123/431

(58) Field of Classification Search ............ 123/1 A, 123/431, 575, 577
See application file for complete search history.

(56) References Cited

U.S. PATENT DOCUMENTS

| | | |
|---|---|---|
| 4,402,296 A | 9/1983 | Schwarz |
| 4,413,604 A | 11/1983 | Tune |
| 4,705,010 A | 11/1987 | Baranescu |
| 4,911,116 A | 3/1990 | Prohaska et al. |
| 5,097,803 A | 3/1992 | Galvin |
| 5,195,466 A | 3/1993 | Schulte et al. |
| 5,336,396 A | 8/1994 | Shetley |
| 6,467,470 B1 | 10/2002 | Carlsson et al. |
| 6,543,423 B2 * | 4/2003 | Dobryden et al. .......... 123/480 |
| 6,711,893 B2 | 3/2004 | Ueda et al. |
| 7,013,873 B2 | 3/2006 | Oomori |
| 7,028,672 B2 | 4/2006 | Glenz et al. |
| 7,159,568 B1 | 1/2007 | Lewis et al. |

(Continued)

FOREIGN PATENT DOCUMENTS

DE 2550722 5/1977

OTHER PUBLICATIONS

Bromberg, V. et al., "Calculations of Knock Suppressions in Highly Turbocharged Gasoline/Ethanol Engines Using Direct Ethanol Injection", Jul. 7, 2005, Massachusetts Institute of Technology.

(Continued)

*Primary Examiner*—Erick Solis
(74) *Attorney, Agent, or Firm*—Allan J. Lippa; Alleman Hall McCoy Russell & Tuttle LLP

(57) ABSTRACT

A fuel delivery system for an internal combustion engine and a method of operating the fuel delivery system are provided. An example embodiment of the method includes: transferring at least some fuel from a first fuel storage region to a second fuel storage region via a pump during a first condition; draining at least some fuel from the second fuel storage region to the first storage fuel region via gravity during a second condition; and delivering fuel from the first fuel storage region to a first fuel injector of a cylinder of the internal combustion engine; and delivering fuel from the second fuel storage region to a second fuel injector of the cylinder.

18 Claims, 5 Drawing Sheets

U.S. PATENT DOCUMENTS

| | | |
|---|---|---|
| 7,216,681 B2 | 5/2007 | Valentine et al. |
| 7,225,787 B2 | 6/2007 | Bromberg et al |
| 7,334,569 B2 | 2/2008 | Kobayashi |
| 7,428,895 B2 | 9/2008 | Leone et al. |
| 7,487,631 B2 | 2/2009 | Cueman et al. |
| 7,523,722 B2 * | 4/2009 | Valentine et al. ............ 123/1 A |
| 7,546,835 B1 | 6/2009 | Hilditch |
| 7,584,740 B2 * | 9/2009 | Boyarski .................... 123/304 |
| 2002/0014226 A1 * | 2/2002 | Wulff et al. ................. 123/525 |
| 2004/0084023 A1 * | 5/2004 | Koegler et al. .............. 123/434 |
| 2006/0254535 A1 * | 11/2006 | Valentine et al. ............ 123/1 A |
| 2007/0119422 A1 | 5/2007 | Lewis et al. |
| 2009/0165759 A1 * | 7/2009 | Sengupta et al. ............ 123/575 |

OTHER PUBLICATIONS

Cohn, D.R. et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.

* cited by examiner

FUEL DELIVERY SYSTEM FOR MULTI-FUEL ENGINE

CROSS-REFERENCE TO RELATED APPLICATIONS

The present application is a continuation of U.S. patent application Ser. No. 12/184,072, entitled "FUEL DELIVERY SYSTEM FOR MULTI-FUEL ENGINE," filed Jul. 31, 2008, the entire contents of which are incorporated herein by reference.

BACKGROUND AND SUMMARY

Various fuel delivery systems may be used to provide a desired amount of fuel to an engine for combustion. One type of fuel delivery system includes a port fuel injector for each cylinder of the engine to deliver fuel to respective cylinders. Still another type of fuel delivery system includes a direct fuel injector for each cylinder of the engine to deliver fuel directly to respective cylinders.

Engines have been described that utilize multiple fuel injector locations for each cylinder to deliver different types of fuel. One example is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describe directly injecting ethanol into the cylinders to improve charge cooling effects, while relying on port injected gasoline for providing the majority of the combusted fuel over a drive cycle.

However, the inventor herein has recognized several issues with such systems. As one example, one of the gasoline or ethanol fuels may be used up by the engine before the other fuel, thereby potentially changing the performance characteristics of the engine. For example, if the ethanol as a knock suppressing fuel is exhausted before the gasoline, the occurrence or intensity of engine knock may increase, or the direct fuel injectors coupled with the ethanol fuel storage tank may over heat as a result of its reduced or discontinued delivery of the ethanol fuel to the engine. Furthermore, the inventor has also recognized that if a substitute fuel is provided to one of the fuel tanks to increase the amount of fuel available to the engine, a subsequent refueling operation of a more desirable fuel (e.g. a knock suppressant fuel) may not be realized where the substitute fuel still resides in the fuel tank.

To address these and other issues, the inventor herein has provided a fuel delivery system for an internal combustion engine and a method of operating the fuel delivery system. An example embodiment of the method includes: transferring at least some fuel from a first fuel storage region to a second fuel storage region via a pump during a first condition; draining at least some fuel from the second fuel storage region to the first storage fuel region via gravity during a second condition; and delivering fuel from the first fuel storage region to a first fuel injector of a cylinder of the internal combustion engine; and delivering fuel from the second fuel storage region to a second fuel injector of the cylinder. For example, the second fuel storage region may be arranged at a higher elevation relative to first fuel storage region.

In this way, a suitable amount of fuel may be maintained in the second fuel storage region by the fuel pump while fuel may be selectively provided to an engine cylinder via at least two different fuel injectors from each of the two fuel storage regions. In some examples, the first fuel injector may be configured as a port fuel injector and the second fuel injector may be configured as a direct fuel injector. By maintaining fuel in the second fuel storage region that supplies fuel to the direct fuel injector, injector overheating may be reduced while also providing sufficient charge cooling to reduce or eliminate engine knock. Yet, where a refueling operation of the second fuel storage region is to be performed, at least some of the previously transferred fuel may be returned to the first fuel storage region by draining the fuel with the assistance of gravity.

DETAILED DESCRIPTION

The following disclosure presents a fuel delivery system that may be configured to deliver one or more different fuels to a fuel burning engine. As a non-limiting example, these fuels may include liquid fuels. In some embodiments, the fuel burning engine may form an engine system for a vehicle, including vehicles powered exclusively by fuel and hybrid electric vehicles (HEV), among others. While a fuel burning engine is described in the context of an internal combustion engine for a vehicle, it should be appreciated that the various fuel delivery approaches described herein are not limited to the disclosed engine configurations or applications, but may be used in other suitable configurations or applications where appropriate.

In some embodiments, a fuel delivery system may be operated to deliver to an engine, two or more fuels having different fuel compositions from two or more different fuel sources. As a non-limiting example, a first fuel including at least a hydrocarbon component may be delivered to the engine from a first fuel storage region via a first fuel injector while a second fuel including at least an alcohol component (e.g. ethanol, methanol, E85, M85, etc.) may be delivered to the engine from a second fuel storage region via a second fuel injector. In some examples, one or more of these fuels may comprise fuel mixtures or blends of two or more different fuels. For example, the second fuel may include a mixture of both alcohol and hydrocarbon components. Further, in some embodiments, the relative amount of each fuel delivered to the engine may be varied by a control system in response to various operating conditions, as described herein.

In some embodiments, a fuel delivery system may be configured to transfer a first fuel from a first fuel storage tank to a second fuel storage tank where it may be mixed with a second fuel having a different composition than the first fuel to form a fuel mixture. Furthermore, in some embodiments, a control system may be configured to adjust one or more operating parameters of the engine, including engine boost and the relative amount of each fuel delivered to the engine in response to operating conditions. Thus, in at least some examples, engine knock may be reduced by selectively adjusting various operating parameters of the engine in response to the type of fuels available for delivery to the engine by the fuel delivery system.

Figure 1:
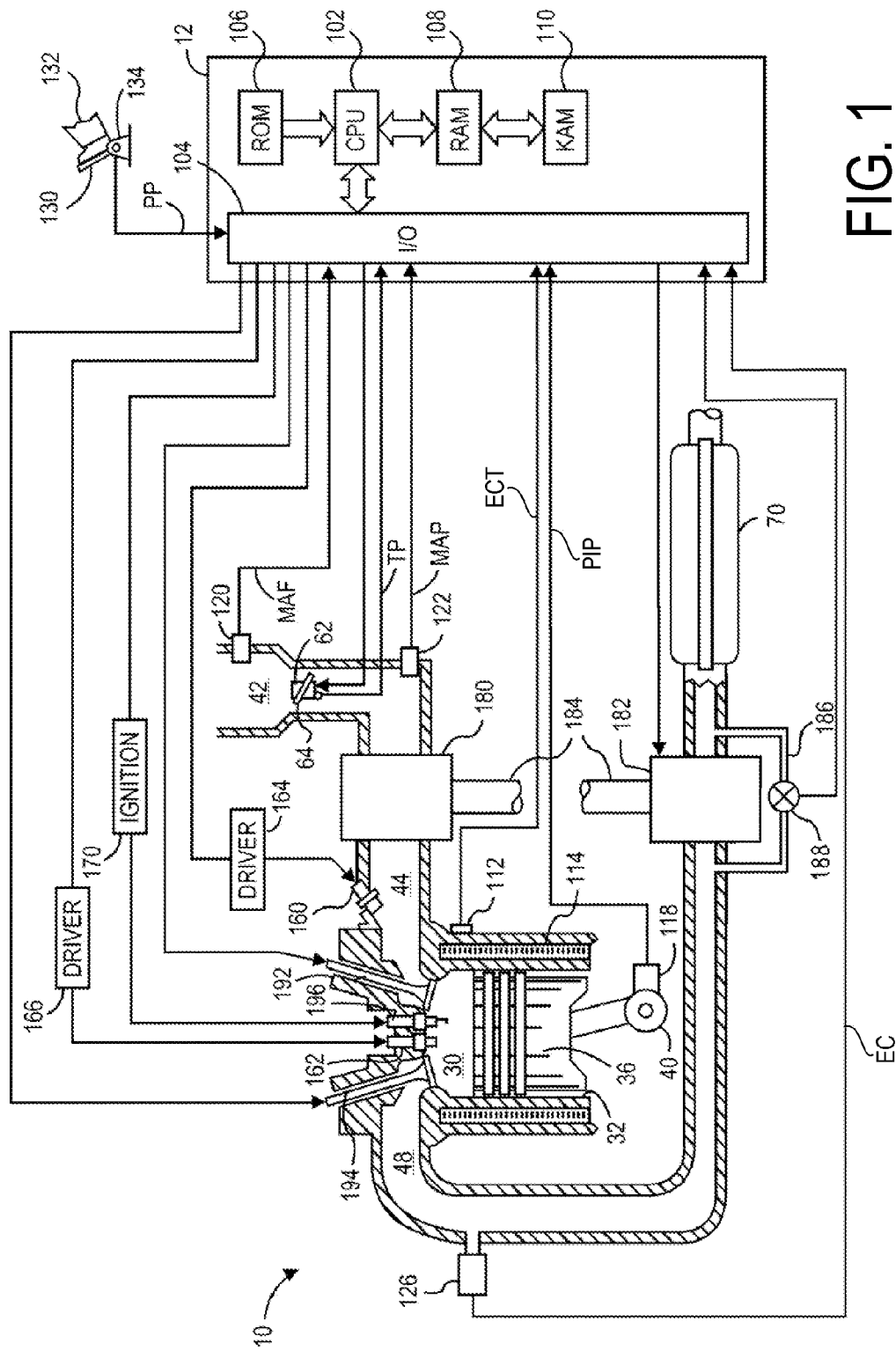
FIG. 1 schematically depicts an example embodiment of a cylinder of an internal combustion engine.

FIG. 1 schematically depicts a non-limiting example embodiment of a combustion chamber or cylinder 30 of an internal combustion engine 10. While engine 10 is described in the context of cylinder 30, it should be appreciate that engine 10 may include one or more other cylinders. For example, engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 30.

Cylinder 30 may be defined by combustion chamber walls 32 and piston 36. Piston 36 can be configured to reciprocate within cylinder 30 and may be coupled to crankshaft 40 via a crank arm. Other cylinders of the engine may also include respective pistons that are also coupled to crankshaft 40 via their respective crank arms.

Cylinder 30 can receive intake air via intake air passage 42 and intake manifold 44. Intake manifold 44 can communicate with other cylinders of engine 10 in addition to cylinder 30. In some embodiments, intake passage 42 can be configured with a boosting device such as a turbocharger or a supercharger. For example, FIG. 1 shows engine 10 configured with a turbocharger including a compressor 180 arranged along intake passage 42 upstream of intake manifold 44 and an exhaust turbine 182 arranged along exhaust passage 48. Compressor 180 can be at least partially powered by exhaust turbine 182 via a shaft 184 in the case of a turbocharger. However, in other examples, such as where engine 10 is provided with a supercharger, turbine 182 may be optionally omitted, whereby compressor 180 may be powered by mechanical input from a motor or the engine.

Exhaust passage 48 can receive exhaust gases from cylinder 30, and additionally from other cylinders of engine 10. Exhaust turbine 182 may optionally include a bypass passage 186 and valve 188 for adjusting an amount of exhaust gases bypassing turbine 182. In some embodiments, a level or amount of boosted intake air provide to the engine cylinders may be varied by adjusting an operating parameter of compressor 180. For example, a level of boost provided by compressor 180 may be adjusted by varying an amount of the exhaust gases bypassing turbine 182 via passage 186. Additionally or alternatively, in some embodiments, one or both of turbine 182 and compressor 180 may include variable geometry components to provide active adjustment of the blade, fan, or impeller geometry of the compressor or turbine. Further still, in some embodiments, compressor 180 may optionally include a compressor bypass for enabling the intake air to at least partially bypass compressor 180, thereby providing yet another way for adjusting the level of boosted intake air provided to the engine cylinders.

Exhaust passage 48 may include one or more exhaust aftertreatment devices indicated generally at 70. A throttle 62 including a throttle plate 64 may be provided in intake passage 42 for varying the flow rate and/or pressure of intake air provided to intake manifold 44. Each cylinder of engine 10 may include one or more intake valves and one or more exhaust valves. For example, cylinder 30 is shown including at least one intake valve 192 and at least one exhaust valve 194. In some embodiments, each cylinder of engine 10, including cylinder 30, may include at least two intake valves and at least two exhaust valves. These intake valves and exhaust valves may be opened and closed by any suitable actuator, including electromagnetic valve actuators (EVA) and cam-follower based actuators, among others. Each cylinder of engine 10 may include a spark plug indicated schematically at 196 with reference to cylinder 30.

Each cylinder of engine 10 may be configured with or may include one or more fuel injectors for providing fuel thereto. As a non-limiting example, cylinder 30 may be configured with a first fuel injector 160 and a second fuel injector 162. These fuel injectors may be configured to deliver fuel to different locations of the engine relative to cylinder 30. For example, fuel injector 160 may be configured as a port fuel injector that delivers fuel to cylinder 30 by injecting fuel upstream of the intake valves (e.g. valve 192), whereby the fuel is entrained into the cylinder by intake air received from intake manifold 44. The second fuel injector 162 may be configured as a direct in-cylinder fuel injector that delivers fuel directly into cylinder 30.

In other examples, each of fuel injectors 160 and 162 may be configured as direct fuel injectors for injecting fuel directly into cylinder 30. In still other examples, each of fuel injectors 160 and 162 may be configured as port fuel injectors for injecting fuel upstream of intake valve 192. In yet other examples, cylinder 30 may include only a single fuel injector that is configured to receive different fuels from the fuel delivery system in varying relative amounts as a fuel mixture, and is further configured inject this fuel mixture either directly into the cylinder as a direct fuel injector or upstream of the intake valves as a port fuel injector. As such, it should be appreciated that the fuel delivery systems described herein should not be limited by the particular fuel injector configurations described herein by way of example.

In some embodiments, engine 10 and the various fuel delivery systems described herein may be controlled by a control system 12. As a non-limiting example, control system 12 may comprise one or more electronic controllers. FIG. 1 depicts an example embodiment of control system 12, including at least one processor (CPU) 102 and memory such as one or more of read-only memory ROM 106, random-access memory RAM 108, and keep-alive memory (KAM) 110, which comprise computer-readable media that may be operatively coupled to the processor. Thus, one or more of ROM 106, RAM 108, and KAM 110 can include system instructions that, when executed by the processor performs one or more of the operations described herein, such as the process flow of subsequent the figures. Processor 102 can receive one or more input signals from various sensory components and can output one or more control signals to the various control components described herein via input/output (I/O) interface 104. In some examples, one or more of the various components of control system 12 can communicate via a data bus.

Control system 12 can be configured receive an indication of operating conditions associated with engine 10 and its associated fuel delivery system via I/O interface 104. For example, control system 12 can receive operating condition information from various sensors, including: an indication of mass air flow (MAF) from mass air flow sensor 120; an indication of intake or manifold air pressure (MAP) from pressure sensor 122, an indication of throttle position (TP) from throttle 62, an indication of engine coolant temperature (ECT) from temperature sensor 112 coupled to cooling sleeve 114, an indication of engine speed from a profile ignition pickup signal (PIP) from Hall effect sensor 118 (or other suitable engine speed sensor) coupled to crankshaft 40; an indication of exhaust gas composition (EC) from exhaust gas sensor 126 which may be used to provide air/fuel ratio feedback to the control system; and an indication of user input from a vehicle operator. In this particular example, user input may be received from a vehicle operator 132 via an accelerator pedal 130 operatively coupled with a pedal position sensor 134, thereby provided an indication of pedal position (PP). A combination of operating conditions such as MAP, MAF, and engine speed can provide the control system with an indication of engine load. Additionally, control system 12 may be configured to receive an indication of operating conditions associated with the various fuel delivery systems described in greater detail herein, including: an indication of an amount of fuel contained in each fuel storage tank and a composition of each fuel available for delivery to the engine, among others.

Control system 12 can also be configured to respond to the operating condition information received by the various sensors by adjusting one or more operating parameters of the engine and its associated fuel delivery system. For example, the control system can vary the amount of fuel delivered to the engine via fuel injectors 160 and 162 by adjusting a fuel injector pulse-width provided by respective drivers 164 and 166. The control system can vary the spark timing provided to each cylinder via ignition system 170. The control system can vary the valve timing of the intake and exhaust valves by any suitable variable valve actuation system including one or more of EVA, variable cam timing, variable valve lift, valve deactivation, etc. The control system can adjust the level of boosted intake air provided to the engine by adjusting an operating parameter of the compressor and/or turbocharger. For example, the control system can adjust the position of bypass valve 188 of turbine 182 and/or adjust a variable geometry component of turbine 182. In other examples, the control system can be configured to adjust the position of a compressor bypass valve and/or a variable geometry component of the compressor to adjust the level of boosted intake air delivered to the engine. Further still, the control system can adjust throttle position via electronically control system throttle 62. Additionally, control system 12 may be configured to adjust one or more operating parameters associated with the fuel delivery system of the engine as will be subsequently described in greater detail, including adjusting the operation of various fuel pumps and valves.

Figure 2:
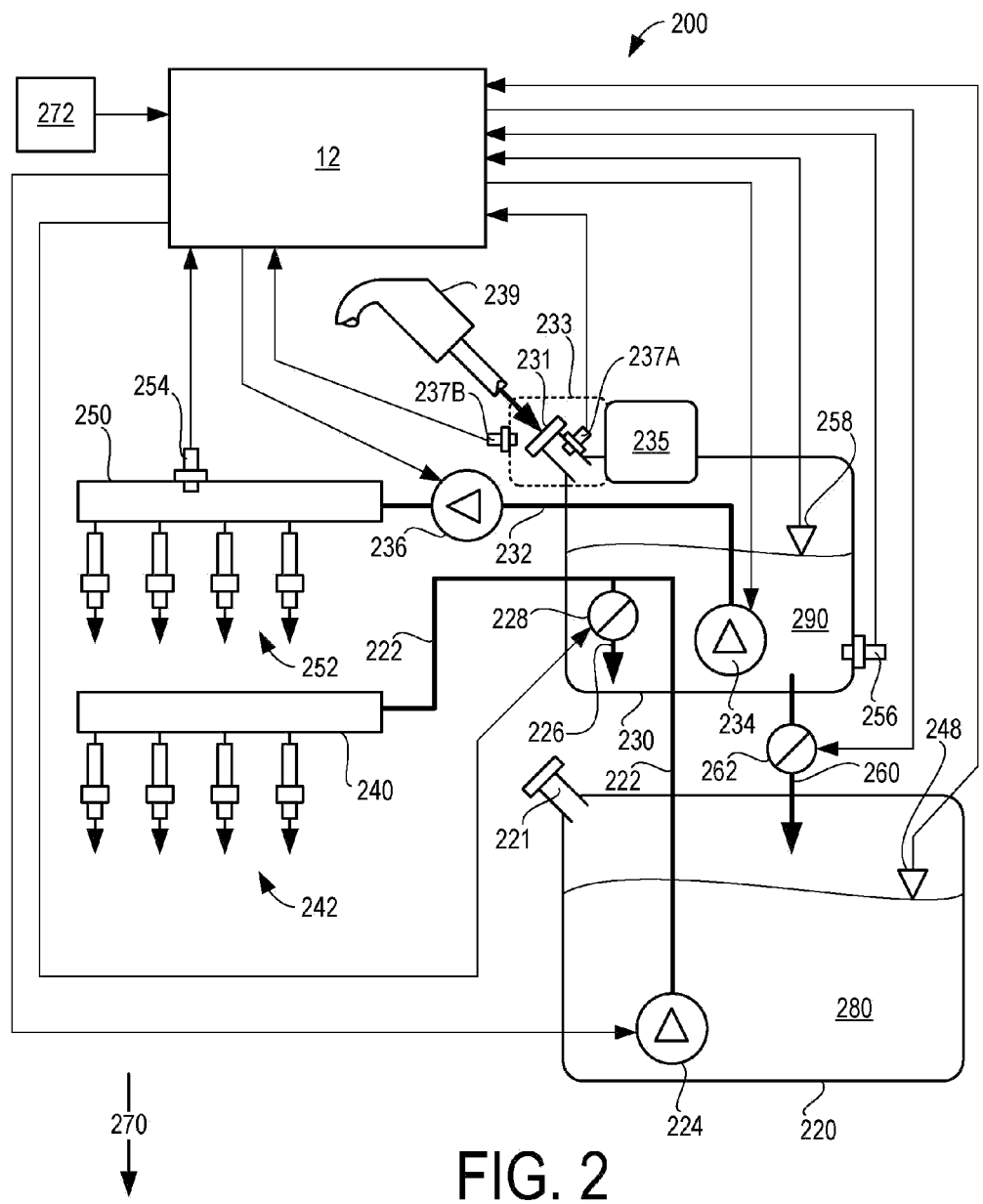
FIG. 2 schematically depicts an example embodiment of a fuel delivery system for the internal combustion engine of FIG. 1.

FIG. 2 schematically depicts an example embodiment of a fuel delivery system 200. Fuel delivery system 200 includes a first fuel storage tank 220 including a first fuel storage region 280 and a second fuel storage tank 230 including a second fuel storage region 290.

As depicted schematically in FIG. 2, the first fuel storage tank may be larger or have a larger fuel storage capacity than the second fuel storage tank. However, in other embodiments fuel storage tanks 220 and 230 may be of similar size or may include similar fuel storage capacities. In still other embodiments, fuel storage tank 230 may be larger or have a larger fuel storage capacity than fuel storage tank 220.

A vector 270 is provided in FIG. 2, which represents the approximate direction of the gravity vector relative to fuel storage tanks 220 and 230. As such, in this particular embodiment, fuel storage region 290 of fuel storage tank 230 is configured at a higher elevation relative to fuel storage region 280 of fuel storage tank 220. This difference in elevation between the two fuel storage tanks permits fuel to be drained from fuel storage tank 230 via fuel drain passage 260 by adjusting (e.g. opening) fuel drain valve 262. In this way, fuel can be selectively transferred from the second fuel storage tank to the first fuel storage tank without requiring a separate fuel pump. However, in other embodiments, a fuel pump may be provided along fuel drain passage 260 for facilitating the draining of fuel storage tank 230.

Fuel storage region 280 of fuel storage tank 220 may be fluidly coupled with one or more fuel injectors of a first fuel injector group 242 by a first fuel delivery passage 222. In this particular embodiment, fuel delivery passage 222 is configured to supply fuel to fuel rail 240, which can in turn distribute fuel to the various fuel injectors of fuel injector group 242. In some embodiments, fuel injector group 242 can correspond to port fuel injectors of an internal combustion engine as previously described with reference to fuel injector 160 of FIG. 1. However, in other embodiments, fuel injector group 242 can correspond to direct fuel injectors.

Fuel delivery passage 222 can also be fluidly coupled with a fuel transfer passage 226 which may include a fuel transfer valve 228. Fuel delivery passage 222 is depicted in the embodiment of FIG. 2 as passing through fuel storage tank 230. However, in other embodiments, fuel delivery passage 222 may remain external fuel storage tank 230, while fuel transfer passage 226 fluidly couples fuel delivery passage 222 with fuel storage tank 230. A fuel pump 224 may be configured to supply fuel from fuel storage region 280 to fuel injector group 242 and fuel transfer valve 228 via fuel delivery passage 222.

Fuel transfer valve 228 may be adjusted by the control system (e.g. opened and closed) to vary a flow rate of fuel from fuel delivery passage 222 to fuel storage tank 230. However, in other embodiments, fuel transfer valve 228 may instead comprise a passive pressure relief valve or check valve that opens to admit fuel to fuel storage tank 230 from fuel delivery passage 222 when the pressure in fuel delivery passage 222 exceeds a prescribed fuel pressure. Thus, the opening and closing of fuel transfer valve 228 may be controlled by the control system by adjusting a pressure at which fuel is supplied to fuel delivery passage 222 by fuel pump 224. In this way, fuel pump 224 can be used to simultaneously or individually supply fuel to one or more fuel injectors and to transfer fuel from the first fuel storage tank to the second fuel storage tank.

Fuel storage region 290 of fuel storage tank 230 may be fluidly coupled with one or more fuel injectors of a second fuel injector group 252 by a second fuel rail 250 and a second fuel delivery passage 232. In some embodiments, fuel injector group 252 can correspond to direct fuel injectors of an internal combustion engine as previously described with reference to fuel injector 162 of FIG. 1.

Fuel delivery passage 232 may include one or more fuel pumps. For example, a lower pressure fuel pump 234 and a higher pressure fuel pump 236 may be provided. However, in other embodiments, higher pressure fuel pump 236 may be omitted. Fuel pumps 224, 234, and 236 may be operated by any suitable mechanical or electrical input. As one example, fuel pumps 224 and 234 may be powered by electric motors, while fuel pump 236 may be powered from a mechanical output of the internal combustion engine.

Fuel delivery system 200 is shown communicating with the previously described control system 12. For example, a fuel level sensor 248 can provide an indication to the control system of an amount of fuel contained in fuel storage tank 220. Similarly, a fuel level sensor 258 can provide an indication to the control system of an amount of fuel contained in fuel storage tank 230.

Various other sensors may be provided. For example, one or more fuel composition sensors may be configured to provide an indication of a composition of a fuel contained in one or more of the fuel storage tanks, as indicated at 256 for fuel storage tank 230. As another example, one or more fuel composition sensors may be configured to provide an indication of a composition of a fuel supplied to the fuel injectors, as indicated at 254 for fuel injector group 252. It should be appreciated that fuel storage tank 220 and fuel injector group 242 may also include fuel composition sensors. These fuel composition sensors can provide an indication to control system 12 of a concentration of a fuel component. For example, one or more of the fuel composition sensors can provide an indication of a concentration of alcohol in the fuel (e.g. such as ethanol, methanol, etc.) or an octane rating of the fuel in the vicinity of the sensor.

The fuel storage tanks may be configured to receive fuel from a fuel source that is external the fuel delivery system or vehicle. For example, fuel storage tank 230 may include a refueling passage 231 that is configured to accept a refueling nozzle indicated schematically at 239. In some embodiments, a refueling sensor may be included that is configured to provide an indication of a refueling operation to control system 12. For example, a refueling sensor 237A may be arranged at a fuel receiving end of the refueling passage whereby the refueling sensor may be configured to provide an indication of a refueling operation to control system 12 when nozzle 239 is inserted into refueling passage 231. As another example, a refueling sensor 237B may be configured to provide an indication of a refueling operation to control system 12 when a fuel door 235 is opened relative to the fuel door frame indicated at 233 formed in the body of the vehicle. In other examples, the refueling sensor may be configured to provide an indication of a refueling operation to control system 12 when a fuel cap in the fuel receiving end of refueling passage 231 is opened. The control system can be configured to open drain valve 262 in response to reception of the refueling operation indication from one or more of these sensors.

In still other examples, a user input device indicated at 272 may be configured to receive a user input causing the user input device to submit a fuel drain signal to control system 12. Control system 12 can be configured to open fuel drain valve 262 in response to reception of the fuel drain signal from user input device 272 to thereby permit fuel to drain from the second fuel storage tank to the first fuel storage tank via fuel drain passage 260. User input device 272 may include any suitable device that enables a user to interface with control system 12, such as a switch, a button, a touch sensitive display, a graphical user interface, etc.

Figure 3:
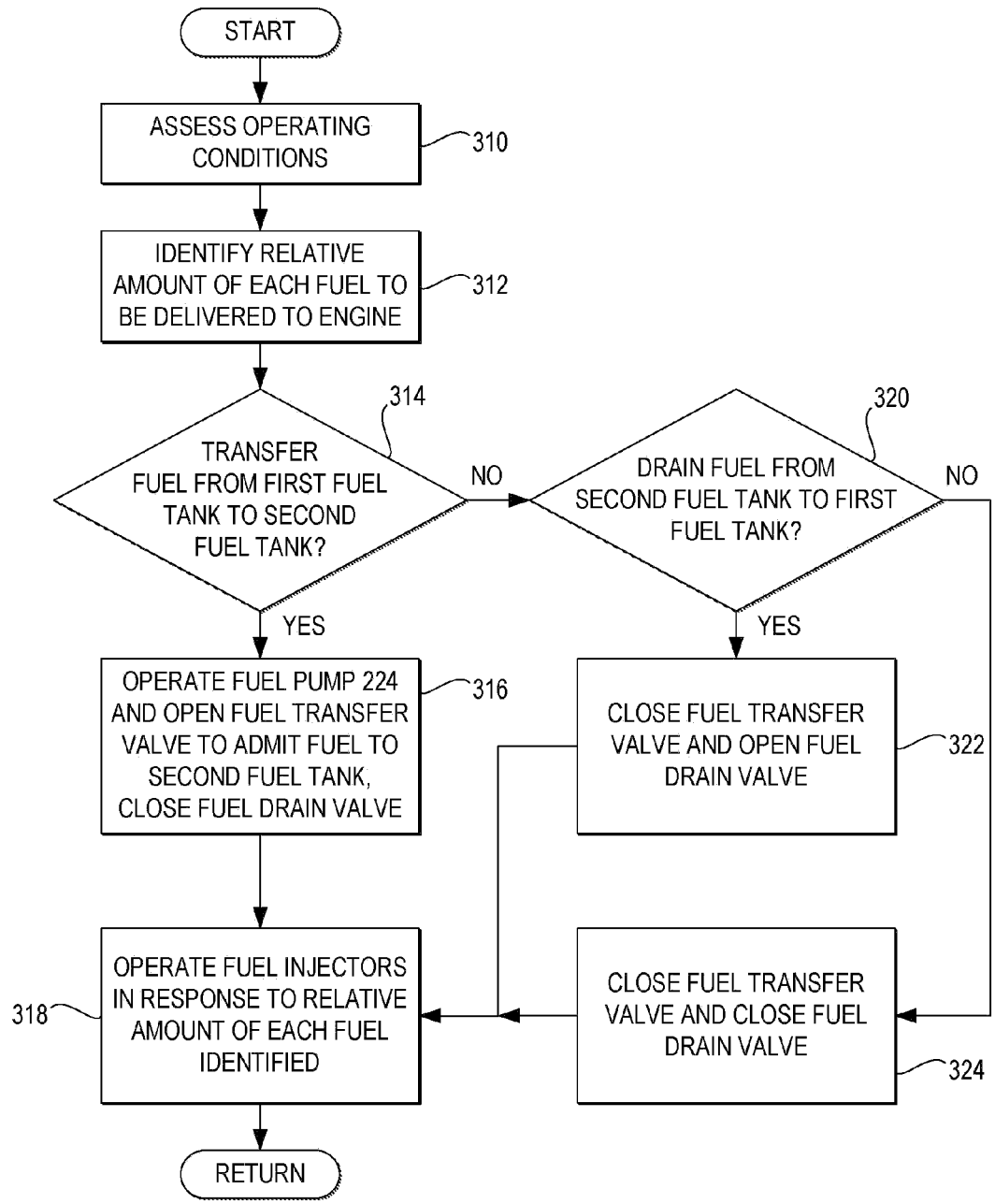
FIG. 3 depicts a process flow that may be used to control the fuel delivery system of FIG. 2.

Referring to FIG. 3, a schematic depiction of an example process flow will be described that may be performed by fuel delivery system 200. As a non-limiting example, the process flow of FIG. 3 may be executed by control system 12 to operate fuel delivery system 200 to transfer fuel between fuel storage tanks and to deliver fuel to one or more cylinders of internal combustion engine 10.

At 310, operating conditions of the fuel delivery system and/or internal combustion engine may be assessed. As one example, the control system may assess operating conditions via one or more of the previously described sensors. For example, the control system may identify an amount of fuel stored in each fuel storage tank (e.g. via sensors 248 and 258), a composition of one or more fuels available to the fuel delivery system (e.g. via sensors 254 or 256), an indication of a refueling operation (e.g. via sensors 237A or 237B), one or more user input devices (e.g. sensors 272 and 134), throttle position (e.g. via signal TP), intake air pressure (e.g. via sensor 122), intake mass airflow (e.g. via sensor 120), exhaust gas composition (e.g. via sensor 126), engine speed (e.g. via sensor 118), and engine temperature (e.g. via sensor 112), among others. Further, the control system may identify ambient conditions including ambient air temperature and pressure by ambient sensors communicatively coupled with the control system. From the various operating condition information, the control system may identify engine load based on one or more of intake air pressure, intake air temperature, engine speed, and intake mass airflow.

Figure 4:
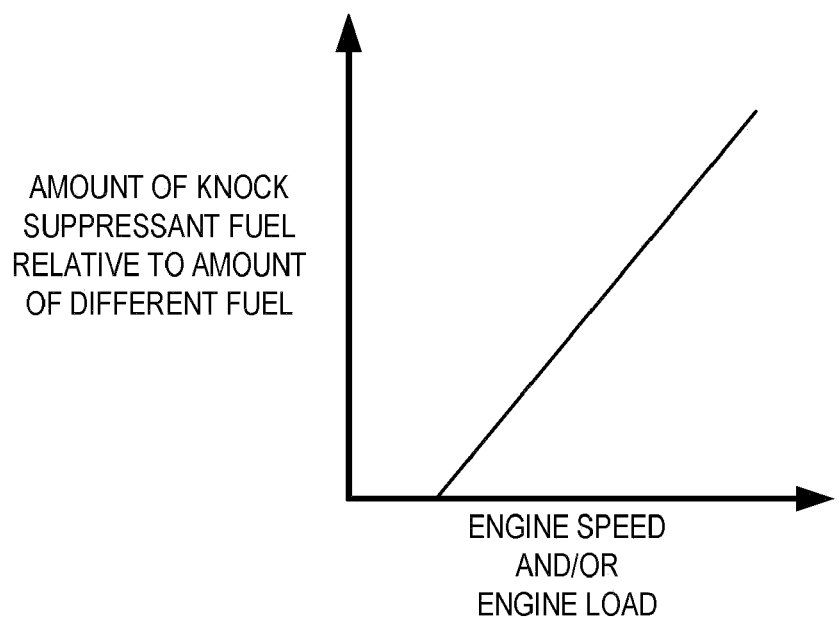
FIG. 4 depicts a graph of an example fuel delivery strategy that may be employed by the control system.

At 312, a relative amount of each fuel to be delivered to the engine may be identified. For example, the control system may reference any suitable function, look-up table, or map stored in memory to identify the appropriate amount of each fuel to be delivered to the engine for a given set of operating conditions identified at 310. For example, referring also to FIG. 4, the control system may increase a relative amount of a knock suppressant (e.g. an alcohol or higher octane fuel) delivered to the engine compared to another fuel with increasing engine speed and/or engine load to reduce knock. Further, the control system can use feedback from an exhaust composition sensor, such as an exhaust oxygen sensor, to identify an appropriate total amount of fuel to be delivered to the engine for a prescribed air/fuel mixture.

At 314, it may be judged whether to transfer fuel from the first fuel storage tank 220 to the second fuel storage tank 230. As a non-limiting example, the control system may judge that fuel is to be transferred from the first fuel storage tank to the second fuel storage tank in response to the operating conditions assessed at 310 and/or the relative amounts of each fuel identified at 312. For example, the control system may compare an amount of fuel stored in fuel storage tank 230 to a threshold minimum amount of fuel stored in memory. When the amount of fuel contained in fuel storage tank 230 is equal to or less than the minimum amount of fuel, the control system may judge the answer at 314 to be yes. In some examples, the control system may further consider the relative amount of each fuel identified at 312 and adjust the minimum amount of fuel accordingly. For example, the control system may increase the minimum amount of fuel when an amount of fuel delivered to the engine from fuel storage tank 230 increases relative to the amount of fuel delivered to the engine from fuel storage tank 220. In this way, the control system can ensure that at least the minimum amount of fuel is available to fuel injector group 252 from fuel storage tank 230. Note that in some examples, the threshold minimum amount of fuel may correspond to a nearly empty condition of the second fuel storage tank so that substantial dilution of the fuel in the second fuel storage tank does not occur until the original fuel is nearly exhausted.

If the answer at 314 is judged yes, the process flow may proceed to 316. At 316, fuel pump 224 may be operated to deliver fuel from fuel storage tank 220 to fuel injector group 242 and fuel transfer valve 228 via fuel delivery passage 222. Further, at 316, the fuel transfer valve may be opened by the control system to admit fuel to fuel storage tank 230 while fuel drain valve 262 is closed. In some examples, the amount of fuel introduced to the second fuel storage tank from the first fuel storage tank may be minimized to reduce the amount of draining required when the original fuel is once again available during a subsequent refueling process. Where fuel transfer valve 228 is configured as a passive pressure relief valve or check valve, the control system can operate fuel pump 224 at a pressure setting that is sufficient to cause valve 228 to open, thereby admitting fuel to the second fuel storage tank 230. In this way, fuel may be transferred from a first fuel storage tank to a second fuel storage tank, thereby enabling operation of the engine system to continue even when the initial fuel stored in the second fuel storage tank is exhausted or reduced in availability.

At 318, one or more fuels injectors associated with fuel injector groups 242 and 252 may be operated to deliver the prescribed relative amounts of each fuel identified at 312. For example, where fuel injector group 352 includes direct fuel injectors and fuel injector group 242 includes port or direct fuel injectors, the control system may operate fuel pumps 234 and 236 to provide the knock suppressant fuel (e.g. a higher concentration alcohol fuel or a higher octane fuel) to fuel rail 250 from fuel storage tank 230, and fuel pump 224 may be operated to provide a different fuel (e.g. a lower concentration alcohol fuel such as gasoline or a lower octane fuel) to fuel rail 240, whereby fuel injector groups 242 and 252 may in turn be operated to deliver the prescribed relative amounts of each fuel to the engine as identified at 312. From 318, the process flow may return to 310.

Returning to 314, if the answer is alternatively judged no (i.e. fuel is not to be transferred from the fuel storage tank 220 to fuel storage tank 230), then the process flow may proceed to 320. At 320, it may be judged whether to drain fuel from fuel storage tank 230 to fuel storage tank 220. As one example, the control system may judge whether to drain fuel from fuel storage tank 230 in response to the operating conditions assessed at 310. For example, the control system may judge the answer to be yes at 320 when an indication of a refueling operation is identified from sensors 237A or 237B, or when a user input is received from user input device 272 that indicates a fuel drainage request by the vehicle operator. In another example, the control system may judge whether there is sufficient fuel in fuel storage tank 220 to carry out the particular fuel delivery strategy identified at 312.

If the answer at 320 is judged yes, fuel transfer valve 228 may be closed and fuel drain valve 262 may be opened to enable fuel to drain from fuel storage tank 230 to fuel storage tank 220 via fuel drain passage 260. In this way, at least a portion of the fuel transferred to fuel storage tank 230 via fuel transfer passage 226 may be returned to fuel storage tank 220 under select operating conditions. For example, the operation at 322 may be performed when it is desired to remove a previously transferred fuel from fuel storage tank 230 before proceeding with a refueling operation of a different fuel. The operation at 322 may also be performed when an incorrect fuel has been supplied to the second fuel storage tank (e.g. as a result of operator error). As such, the second fuel storage tank may be manually drained by input received from the vehicle operator, or may be drained responsive to the control system detecting an improper fuel in the second fuel storage tank, such as by one or more of fuel composition sensors 256 and 254. From 322, the process flow may proceed to 318 where the fuel injectors may be operated to carry out the particular fuel delivery strategy identified at 312.

Returning to 320, if the answer is alternatively judged (i.e. fuel is not to be drained from fuel storage tank 230 to fuel storage tank 220), then the process flow may proceed to 324. At 324, both the fuel transfer valve and the fuel drain valve may be closed. From 324, the process flow may proceed to 318 where the fuel injectors may be operated to carry out the particular fuel delivery strategy identified at 312.

Figure 5:
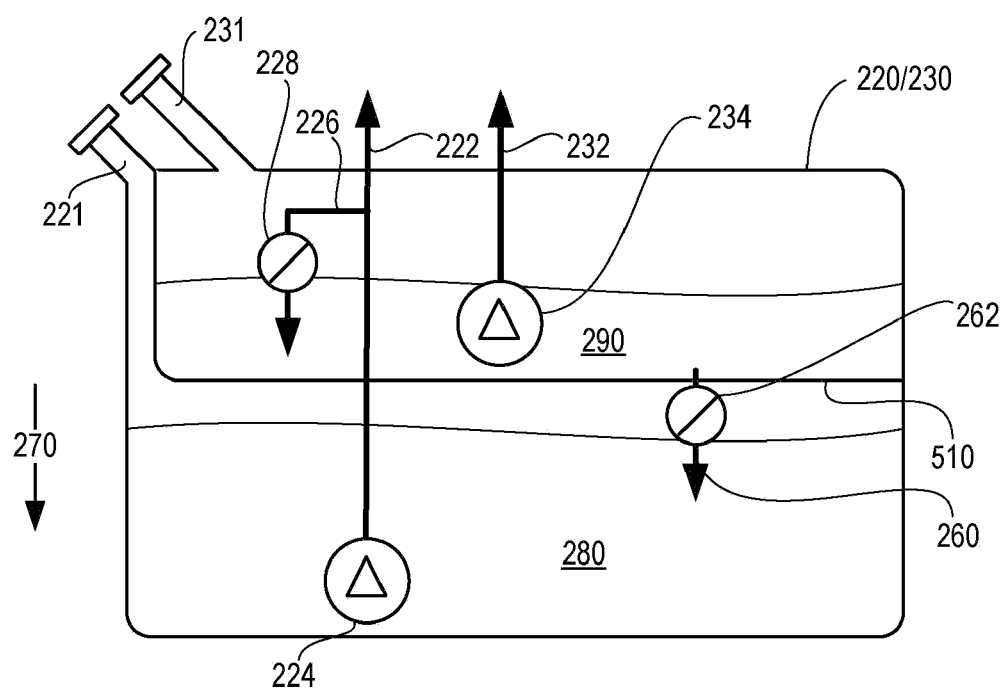
FIG. 5 depicts an example embodiment of an alternative fuel storage tank that may be used with the fuel delivery system of FIG. 2.

FIG. 5 schematically depicts an example embodiment of a combined fuel storage tank 220/230 that has two separated fuel storage regions 280 and 290. In this particular example, fuel storage region 280 is separated from fuel storage region 290 by a fuel separation barrier 510. In some embodiments, fuel separation barrier 510 may comprise a flexible or semi-flexible membrane that at least partially defines one or more of the first fuel storage tank and the second fuel storage tank. In some embodiments, fuel separation barrier may comprise a rigid wall that is formed from one or more walls of fuel storage tanks 220 and 230. Thus, as depicted by FIG. 5, in at least some examples, two or more fuel storage regions may be formed from a common fuel storage tank. Fuel composition sensors and/or fuel level sensors may also be provided with the example embodiment of FIG. 5 as previously described with reference to FIG. 2.

Figure 6:
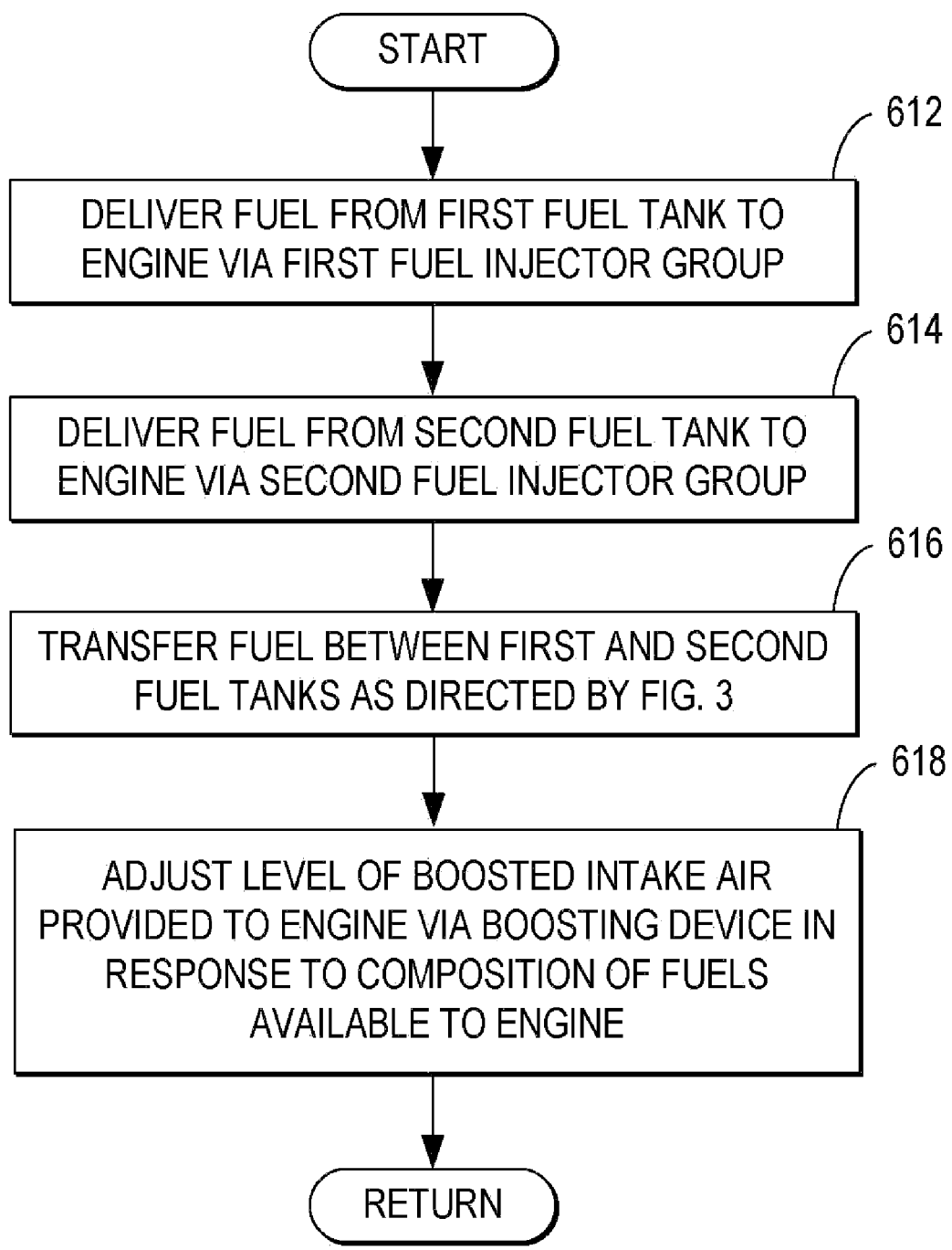
FIG. 6 depicts a process flow that may be used to control an amount of intake air boost provided to the engine in response to fuel composition in one or more of the fuel storage tanks.

FIG. 6 depicts a process flow that may be used to control an amount of intake air boost provided to the engine in response to fuel composition in one or more of the fuel storage tanks. For example, at 612 and 614, the control system may deliver fuel from the first and second fuel storage tanks to the engine via the first fuel injector group (e.g. 242) and the second fuel injector group (e.g. 252), respectively. The relative amounts of each fuel deliver to the engine by the first and second injector groups may be selected by the control system in response to operating conditions such as engine speed and load as previously described with reference to FIG. 4.

At 616, fuel may be transferred between the first and second fuel storage tanks as directed, for example, by FIG. 3. For example, as previously described with reference to operation 312, the decision to transfer fuel between the fuel storage tanks can be based on an amount of fuel stored in one or more of the fuel storage tanks. However, in other examples, the control system can be configured to transfer fuel from the first fuel storage tank (e.g. 220) to the second fuel storage tank (e.g. 230) in order to maintain a prescribed fuel concentration or range of fuel concentrations in the second fuel storage tank.

At 618, the level of boosted intake air provided to the engine via the boosting device may be adjusted in response to the composition of one or more fuels available to the engine. For example, the control system may identify the concentration of the knock suppressant component in one or more of the fuels stored in the first and second fuel storage tanks. As one example, the control system can identify a concentration of alcohol contained in the fuel stored in the fuel storage tank that is fluidly coupled with the direct fuel injectors, such as fuel storage tank 230 via sensor 256. Alternatively, the control system can identify a concentration of alcohol in the fuel supplied to the engine via the direct fuel injector, such as via sensor 254, or by feedback received from exhaust gas sensor 126.

As a non-limiting example, the control system may be configured to, for a given set of operating conditions, operate the engine with a higher level of boosted intake air when the concentration of the knock suppressant (such as an alcohol) in the fuel contained in the second fuel storage tank or in the fuel delivered to the engine by the direct fuel injectors is higher, and may operate the engine with a lower level of boosted intake air when the concentration of the knock suppressant in the fuel contained in the second fuel storage tank or in the fuel delivered to the engine by the direct fuel injectors is lower. In this way, engine knock may be reduced and eliminated even when the composition of one or more of the fuels that are delivered to the engine is changing as a result of a fuel transfer between fuel storage tanks or as a result of a refueling operation of the fuel storage tank.

Note that the example process flows included herein can be used with various fuel delivery system, engine, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a fuel delivery system of an internal combustion engine, the fuel delivery system including a first fuel storage region and a second fuel storage region, the method comprising:
    transferring at least some fuel from the first fuel storage region to the second fuel storage region via a pump when an amount of fuel stored in the second fuel storage region is less than a threshold amount;
    draining at least some fuel from the second fuel storage region to the first storage fuel region via gravity during a second condition; and
    delivering fuel from the first fuel storage region to a first fuel injector of a cylinder of the internal combustion engine;
    delivering fuel from the second fuel storage region to a second fuel injector of the cylinder; and
    increasing the threshold amount when an amount of fuel delivered to the engine from the second fuel storage region increases relative to an amount of fuel delivered to the engine from the first fuel storage region.

2. The method of claim 1, further comprising, injecting the fuel delivered to the first fuel injector into an air intake passage of the cylinder via the first fuel injector; and injecting the fuel delivered to the second fuel injector directly into the cylinder via the second fuel injector.

3. The method of claim 2, further comprising, varying an amount of the fuel injected directly into the cylinder via the second fuel injector relative to an amount of the fuel injected into the air intake passage of the cylinder via the first fuel injector in response to an operating condition of the cylinder.

4. The method of claim 1, wherein the second condition includes a refueling operation of the second fuel storage region.

5. The method of claim 1, wherein the second condition includes a user initiated draining request.

6. The method of claim 1, wherein delivering fuel from the first fuel storage region to the first fuel injector of the cylinder includes delivering at least gasoline to the first fuel injector; and wherein delivering fuel from the second fuel storage region to the second fuel injector of the cylinder includes delivering at least alcohol to the second fuel injector.

7. The method of claim 1, wherein draining at least some fuel from the second fuel storage region to the first storage fuel region via gravity includes draining at least some of the fuel previously transferred from the first storage region.

8. A fuel delivery system for an internal combustion engine, comprising:
    a first fuel storage tank;
    a second fuel storage tank including a fuel storage region positioned at a higher elevation relative to a fuel storage region of the first fuel storage tank;
    a fuel drain passage fluidly coupling the second fuel storage tank with the first fuel storage tank;
    a fuel drain valve arranged along the fuel drain passage for controlling a flow rate of fuel from the second fuel storage tank to the first fuel storage tank;
    a first fuel injector configured to deliver fuel to an internal combustion engine;
    a fuel delivery passage fluidly coupling the first fuel storage tank with the first fuel injector;
    a fuel transfer passage fluidly coupling the fuel delivery passage with the second fuel storage tank;
    a fuel transfer valve arranged along the fuel transfer passage for controlling a flow rate of fuel from the fuel delivery passage to the second fuel storage tank;
    a fuel pump arranged along the fuel delivery passage between the first fuel storage tank and the fuel transfer passage; and
    a control system configured to:
        operate the fuel pump to supply fuel from the first fuel storage tank to the first fuel injector and the fuel transfer valve via the fuel delivery passage;
        operate the first fuel injector to deliver to the engine a first portion of the fuel supplied by the fuel pump;
        selectively open the fuel transfer valve to transfer to the second fuel storage tank a second portion of the fuel supplied by the fuel pump to maintain at least a minimum amount of fuel in the second fuel storage tank, the minimum amount of fuel adjusted responsive to engine operating conditions; and
        selectively open the fuel drain valve in response to an operating condition to transfer at least some of the previously transferred second portion of the fuel from the second fuel storage tank to the first fuel storage tank via the fuel drain passage.

9. The fuel delivery system of claim 8, further comprising:
    a second fuel injector fluidly coupled with the second fuel storage tank via at least a second fuel pump; and
    wherein the control system is further configured to:
        operate the second fuel pump to supply fuel from the second fuel storage tank to the second fuel injector; and
        operate the second fuel injector to deliver to the engine the fuel supplied by the second fuel pump.

10. The fuel delivery system of claim 9, wherein the second fuel injector is configured to inject the fuel supplied by the second fuel pump directly into a cylinder of the engine; and wherein the first fuel injector is configured to deliver the first portion of the fuel supplied by the first fuel pump into an air intake passage of the cylinder of the engine.

11. The fuel delivery system of claim 10, wherein the control system is further configured to vary an amount of the fuel delivered to the engine via the second fuel injector relative to an amount of the first portion of the first delivered to the engine via the first fuel injector in response to engine load.

12. The fuel delivery system of claim 8, wherein the wherein the first fuel storage tank has a larger fuel storage capacity than the second fuel storage tank.

13. The fuel delivery system of claim 8, wherein the fuel storage region of the first fuel storage tank is separated from the fuel storage region of the second fuel storage tank by a rigid wall defining at least one of the first fuel storage tank and the second fuel storage tank.

14. The fuel delivery system of claim 8, wherein the fuel storage region of the first fuel storage tank is separated from the fuel storage region of the second fuel storage tank by a flexible membrane.

15. A method for operating a fuel delivery system of an internal combustion engine, comprising:
   operating a first fuel pump to supply gasoline from a first fuel storage region to a first fuel passage, said first fuel passage fluidly coupling the first fuel storage region with a port fuel injector of the engine and a fuel transfer valve;
   injecting at least some of the gasoline received from the first fuel delivery passage into an air intake passage of a cylinder of the engine via the port fuel injector;
   transferring at least some of the gasoline from the first fuel passage to a second fuel storage region via the fuel transfer valve to create a fuel mixture with the transferred gasoline and an alcohol contained in the second fuel storage region;
   operating a second fuel pump to supply at least some of the fuel mixture from the second fuel storage region to a direct fuel injector;
   injecting the fuel mixture received from the second fuel pump directly into the engine cylinder via the direct fuel injector;
   draining at least some of the fuel mixture from the second fuel storage region to the first fuel storage region via a fuel drain valve in response to an operating condition; and
   adjusting the fuel transfer valve in response to an amount of the fuel mixture stored in the second fuel storage region and in response to a relative amount injected from the port fuel injector and the direct fuel injector.

16. The method of claim 15, wherein the operating condition includes an indication of a refueling operation of the second fuel storage region where a fuel is to be added to the second fuel storage region from an external fuel source or a draining request initiated by a user.

17. The method of claim 15, further comprising, varying an amount of the gasoline injected via the port fuel injector relative to an amount of the fuel mixture injected via the direct fuel injector in response to a level of boost provided to the engine by a boosting device.

18. The method of claim 17, further comprising, varying the level of boost provided to the engine by the boosting device in response to a composition of the fuel mixture injected by the direct fuel injector.

\* \* \* \* \*